Patented June 20, 1944

2,351,798

UNITED STATES PATENT OFFICE 2,351,798

COATING METAL ARTICLES

Peter P. Alexander, Marblehead, Mass.

No Drawing. Application August 14, 1941,
Serial No. 406,908

7 Claims. (Cl. 117—22)

This application relates to a process of coating metallic bodies with a coating containing titanium, and more especially to a process wherein certain metals may be so coated at a temperature below the melting points of any of the metals concerned.

The coating of one metal with another under the application of heat is, to a limited extent, known, for example the coating of the surface of a piece of iron with copper or copper rich alloys. The operation of the commercial processes for coating iron with copper depend on the fact that copper or copper rich alloys will spread by capillarity, in a thin layer, over the surface of the iron if subjected to temperature above the melting point of the copper or copper rich alloys in an atmosphere of hydrogen, the thin layer of copper penetrating into the small surface cracks or crevices and even flowing over small surface projections. The copper in spreading over the iron does not form an alloy, even where the heat treatment is continued to the point where there is some penetration of the surface of the iron by the copper, but remains as a substantially pure copper layer on the surface.

In similar manner molten nickel also wets the surfaces of and spreads over some metals, the coating of the metals being carried out at temperatures exceeding the melting point of nickel.

As heretofore known the hydrogen brazing processes have had a limited application to those metals which will flow by capillarity over the surface of the metal to be coated and which metals to constitute the coating have lower melting points than the metal to be coated upon. It will be manifest that such processes would be limited to these conditions as, if the surface metal has a higher melting point than the metal over which it is to be flowed, the metal to be coated will be reduced to liquid condition before the surface metal.

I have found that there is what, in certain aspects, may be considered an exception to the accepted limitations of the hydrogen brazing processes, according to the prior knowledge of this art, although in other aspects my discovery depends on factors different from those incident to the brazing of copper on iron or the like.

In accordance with the accepted knowledge of the art it would appear to be impossible to flow titanium over the surface of copper, as the latter, among other particulars, has a lower melting point than titanium and would be reduced to liquid condition prior to the melting of the titanium, the melting point of copper being about 700° C. lower than that of titanium. However, I have discovered that titanium at the temperature of red heat has a strong affinity for copper and if the two metals come in contact at this temperature they diffuse in solid state, one into the other, to form a low melting point alloy at the point of contact. Furthermore, if the surface of the copper article is dusted or otherwise covered with powdered titanium and the temperature raised to red heat, each particle of titanium will form a low melting point alloy at the point of contact with the copper and, if the heat treatment is continued for a few minutes, the titanium will flow over the surface of the copper forming a surface coating consisting of an alloy of copper and titanium. The composition of the surface layer is, of course, regulated by the temperature, since at a given temperature only an alloy of a definite composition will form and spread by capillarity, the minimum temperature at which the process may be carried out being substantially that of the melting point of the eutectic alloy.

If there is no surface oxidation of the two metals the process may be carried out in a neutral atmosphere or in a high vacuum, but in its preferred form the process is carried out in a reducing atmosphere, specifically an atmosphere of pure hydrogen which hydrogen atmosphere is conveniently and preferably brought about through the use of titanium in the form of titanium hydride from which hydride the hydrogen is liberated at the brazing temperature, that is, red heat.

As a further aid in understanding the manner in which the surface of an object made of copper may be coated with titanium according to the invention, reference may be had to the following:

An object made of copper is dipped in alcohol, or some other liquid which will readily evaporate and leave a clean surface free from carbon or other contaminating material. Carbon tetrachloride can also be used to advantage. An additional application of the above liquids on the surface is left slightly wet and is then dusted with titanium hydride in the form of fine powder so that the whole surface is more or less evenly covered with particles of titanium hydride. The coated copper object is placed in a vacuum furnace and heated in a vacuum to a temperature of 878° C. The titanium hydride will dissociate gradually, the hydrogen sweeping from the mass reducing any oxides of the copper and titanium present on the surfaces thereof, the titanium particles alloying with the copper at their points of contact and the copper and titanium diffusing into one another to form an alloy which spreads over the surface of the copper object like oil, the alloy forming the surface coating having, in this case, a composition of about 70% copper and 30% titanium. The operation takes only a few minutes.

If the process just described is stopped as soon as the titanium alloy has spread over the surface of the copper object, the latter will be provided with a surface coating having a silver-like color and a high degree of resistance to oxidation. Under these conditions, that is to say, where the copper object is cooled as soon as the titanium alloy has spread over the surface of the object, the copper-titanium alloy will remain as a layer on the surface of the copper object, but if the heat treatment is continued there will be a diffusion of the alloy layer into the copper.

As an example of this process, purely for the purpose of illustration, I give the following:

A copper article had a weight of two pounds and a flat top with an area of 100 square inches. This was washed with strong alcohol. A thin layer of finely powdered titanium hydride (dry powder, 325 mesh) was then spread uniformly over said 100 square inches. The amount of the titanium hydride, so employed was one ounce.

The copper article with the layer of powdered titanium hydride, was placed in a muffle capable of being heated. A vacuum was drawn in said muffle and sealed. The muffle and its contents were then heated until the copper article was at a temperature of 878° C., which temperature was maintained for 20 minutes. The muffle was then allowed to cool and the article then removed. It was found that the entire flat top of the article had thereby been coated with an alloy of copper and titanium, having the properties stated above.

In the example given above the titanium hydride is applied directly to the surface of the copper object by dusting the same thereon in the form of titanium hydride. However it is not always necessary to proceed in this manner, as the titanium may be brought into contact with the surface of the copper object in other ways for example as follows:

Titanium hydride and the copper object are placed in spaced relation in a furnace and the temperature of each raised to 878° C. The furnace is preferably evacuated from a point nearer to the copper object than to the titanium hydride so that as the latter dissociates, under the action of the heat, the hydrogen and other volatile constituents of the titanium hydride will pass around the copper object on their way out of the furnace. The decomposition of titanium hydride under heat is not fully understood but it is believed that, in addition to hydrogen, a volatile titanium hydride which may be represented by the formula TiH$_4$ is given off. The TiH$_4$ upon striking the surface of the copper object immediately dissociates into titanium and hydrogen. The surface of the copper object becomes covered by titanium precipitated in this manner, which titanium eventually alloys with the copper and spreads over the entire surface thereof to form a uniform thin layer. I do not commit myself to the theory that the coating of the copper object results from the decomposition of TiH$_4$, suffice it to say, whether the formula TiH$_4$ represents the material contacting the copper object or not, it will be found that although the process described above is carried out below the melting points of both the copper and the titanium, nevertheless the copper, although separated from the titanium hydride in the furnace, becomes coated with a titanium alloy which flows over and coats the surface thereof.

Commercial grades of titanium metal or hydride are never free from carbon and nitrogen for which it has great affinity. A small percentage of the particles of powdered material therefore are partly or entirely of the composition of titanium carbide or nitride. These hard particles do not alloy with copper but are imbedded in the resulting layer, increasing its resistance to abrasion. When the first example was repeated with very impure titanium metal a much harder surface was obtained.

In the above examples it is not necessary to use pure titanium as titanium-rich alloys such as titanium-zirconium may be used and the process may also be carried out in connection with the coating of copper alloys provided their melting points are substantially higher than 878° C.

The coating of copper with titanium or titanium alloys in the above manner leaves a surface on the copper of silver-like color and highly resistant to oxidation which has many industrial applications. It also may serve as an intermediate step in the formation of other surface coatings. Thus the copper object, after being coated with titanium, may be provided with an extremely hard surface through the formation of surface titanium carbide. In this case the heat treatment of the copper object coated with a layer of titanium alloy is continued until the alloy layer diffuses into the copper. The surface of the copper will then contain a sufficient amount of titanium such that carbon may be diffused into and combine with the titanium at relatively high temperatures to form titanium carbide. This may be accomplished by the usual carbonizing methods by packing the copper object in carbonaceous materials and subjecting the same to the prerequisite degree of heat. Likewise boron may be diffused into the titanium at the surface of the copper to form titanium boride, titanium boride being also extremely hard.

The treatment with boron or carbon can be carried out as described above, yet in a given example another technic was used, namely a copper object was covered with a layer of titanium hydride, then a layer of finely powdered boron was spread over the first layer and finally another layer of titanium hydride was put over the boron which was therefore thoroughly protected from oxidation. The object was then heat treated in the manner described above. When the article is treated with carbon an excess of this material is applied to the surface without the necessity of an additional layer of titanium hydride.

The description of the invention up to this point has related entirely to the formation of surface coatings for copper or copper alloys, but it has a broader aspect than the formation of these coatings on copper which may be incidental to the treatment of other metals. Thus it is possible to combine the treatment of the copper or copper alloys with other steps leading to the production of valuable coatings and surface characteristics in metals of the iron group.

Titanium does not form low melting point alloys with the metals of the iron group and therefore will not spread over these metals at low temperature, as it does with copper. If an object made of iron is plated or otherwise coated with copper or copper alloy, the titanium or titanium alloy may be flowed thereover in the same manner as if the object were made entirely of copper and by continued heat treatment the surface alloy of copper and titanium may be diffused into the metal of the iron group. After the diffusion of the alloy of copper and titanium into the metal of the iron group, the latter may also be packed in granular or pulverulent carbonaceous material or pure boron which at high temperatures in the neighborhood of red heat will gradually diffuse into the surface, forming titanium carbide or titanium boride as the case may be. In place of the pure boron, boron-calcium may be used and, if desired, the same article may be both carbonized and boronized.

If, during the operation of the process, the copper is covered by a thin layer of titanium which is flowed over the surface of the copper, in the manner described above, the physical shape of the surface of the copper will be maintained and the thickness of the coating increased by additional thin layers of titanium which are heated and flowed over the surface in the form of copper titanium alloys. If the maintenance of the physical shape of the surface of the copper is not of importance, the thickness of the layer of titanium applied to the surface, and flowed thereover by heating, may be increased.

The carbonizing and boronizing of the metals of the iron group may be effected prior to the diffusion of the copper titanium alloy into the iron metal or after the diffusion thereof into the iron metal, but in the case of copper or copper alloys it will be found to be preferable but not necessary to carbonize or boronize before diffusion of the coating of the copper titanium alloy into the copper.

While I have described the improved process with great particularity, it will be understood that the same is not to be limited except within the spirit of the invention and scope of the appended claims.

For best results, the surface of the copper should be free from oxidation, when treating with the titanium hydride, but small amounts or traces of copper oxide on the surface of the copper initially will be reduced to metallic copper by the hydrogen liberated from the titanium hydride. The solid titanium hydride is represented by the formula $TiH_2$ but the commercial grades which I use contain less hydrogen and can be represented by the formula $Ti_2H_3$.

The subject matter of the above case is largely disclosed in my earlier application Serial No. 256,301, filed February 14, 1939.

What I claim is:

1. The process of coating a body at least the surface portions of which are formed of a metal which consists at least in part of copper with an alloy consisting at least in part of titanium which comprises, coating the surface of the body with a thin layer of the titanium hydride in powdered form, applying heat to the body and the powdered titanium hydride in an atmosphere of hydrogen and maintaining the temperature of the body and titanium metal above 878° C. but below the melting point of copper until the copper and titanium metal diffuse into one another and flow over the surface of the body.

2. The process of coating a body at least the surface portions of which are formed of a metal which consists at least in part of copper with an alloy consisting at least in part of titanium which comprises, covering the surface of the body with a thin layer of finely powdered titanium hydride, applying heat to the body and hydride sufficiently to dissociate the latter and maintaining the temperature of the body and titanium liberated from the hydride above 878° C. but below the melting point of copper until the copper and titanium diffuse into one another and flow over the surface of the body.

3. The process of coating a body at least the surface portions of which are formed of a metal which consists at least in part of copper with an alloy consisting at least in part of titanium which comprises, covering the surface of the body with a thin layer of finely powdered titanium hydride, applying heat to the body and hydride sufficiently to dissociate the latter and maintaining the temperature of the body and titanium liberated from the hydride above 878° C. but below the melting point of copper until the copper and titanium diffuse into one another and flow over the surface of the body, maintaining a reducing atmosphere in contact with said copper and titanium material during a large part, at least, of said heating step, and discontinuing the application of heat as soon as the alloy of copper and titanium has flowed over the surface of the body.

4. The process of coating a body at least the surface portions of which are formed of a metal which consists at least in part of copper with a coating containing titanium which comprises covering the surface of the body with a thin layer including titanium hydride and then applying heat to the body and the titanium hydride in a non-oxidizing or reducing atmosphere to diffuse the copper and titanium into one another and to flow the resulting alloy over the surface of the body until a coating of the required thickness is brought about.

5. The process of coating a body at least the surface portions of which are formed of a metal which consists at least in part of copper with a coating containing titanium which comprises, covering the surface of the body with a thin layer of powdered titanium hydride, applying heat to the body and hydride sufficiently to dissociate the latter and maintaining the temperature of the body at above 878° C. but below the melting point of copper until the coating formed flows over the surface of the body.

6. The process of coating a body at least the surface portions of which are formed of a metal which consists at least in part of copper with an alloy consisting at least in part of copper and titanium which comprises, dissociating titanium hydride by the application of heat thereto in the presence of the body, while heating the body to 878° C. but below the melting point of copper and maintaining the temperature of the body until the surface thereof is covered by a coating containing titanium.

7. The process of coating a body at least the surface portions of which are formed of a metal which consists at least in part of copper, with a coating containing titanium, which comprises, dissociating titanium hydride by the application of heat thereto in the presence of the said body, heating the said body to 878° C. but below the melting point of copper and maintaining the temperature of the said body until the surface thereof is covered by the coating containing titanium.

PETER P. ALEXANDER.